United States Patent Office 2,723,985
Patented Nov. 15, 1955

2,723,985

DISPROPORTIONATION OF ALLYL- AND BUTENYLALKOXYSILANES

Donald Leroy Bailey, Buffalo, N. Y., assignor to Union Carbide and Carbon Corporation, a corporation of New York No Drawing. Application October 17, 1952, Serial No. 315,438

11 Claims. (Cl. 260—448.2)

This invention relates to a method for disproportionating allyl- and butenylalkoxysilanes. More particularly, the invention relates to a method for effecting a redistribution of the groups attached to silicon in such a manner that molecules useful in many syntheses are obtained. In the instance of allyltrialkoxysilane, a redistribution occurs whereby the diallylalkoxysilane and tetraalkylsilicate together with other complex alkoxysilanes are obtained. In the instance of butenyltrialkoxysilane, a redistribution occurs whereby the dibutenylalkoxysilane and tetraalkylsilicate are obtained.

According to the present invention, the disproportionation is accomplished by treating allyl- and butenylalkoxysilanes with a suitable catalyst at a temperature of at least 150° C. However, as the reaction is in equilibrium, it may be conducted at reflux temperatures in a flask attached to a fractionating column, thereby permitting the removal of the lower-boiling product, tetraalkylsilicate, and thus driving the reaction to completion with increased yields.

For the catalyst, I prefer to employ an alkali metal alkoxide for example, sodium or potassium ethoxide. The amount of catalyst employed is not critical and, as the preferred catalysts are readily available at reasonable costs, 0.75% or more may be used.

The following examples more fully disclose the invention:

Example I 134.5 grams of butenyltriethoxysilane and 2 grams of sodium ethoxide were placed in a 250 cc. flask and the flask connected to a fractionating column. The mixture was refluxed for 20 hours during which time 46 grams of material distilling below 175° C. were removed from the column. Fractionation of this low-boiling product and the residual material separately disclosed the following:

| Product: | Amount, grams |
|---|---|
| Si(OC₂H₅)₄ | 46 |
| Butenyltriethoxysilane | 49 |
| Dibutenyldiethoxysilane | 23 |
| Residue | 11 |

Example II

In a 250 cc. flask attached to a fractionating column, there were placed 137 grams of allyltriethoxysilane and 1.2 grams of sodium ethoxide. The mixture was heated at the reflux temperature for five hours during which time 52 grams of material distilling below 165° C. were removed from the column. Fractionation of this low-boiling material and the residual material separately gave 63 grams of tetraethylsilicate and a complex mixture of allylethoxysilanes. A recovery of ethylsilicate from the reaction indicated that disproportionation of allyl and ethoxy groups had taken place.

Allyl and butenylalkoxysilanes which may be disproportionated in accordance with my invention are those that contain only alkoxy and allyl or butenyl radicals attached to silicon; and those that contain only alkoxy, alkyl, and allyl or butenyl radicals attached to silicon. For example, dibutenyldialkoxysilane may be disproportionated in accordance with this invention to give tributenylalkoxysilane and butenyltrialkoxysilane. Furthermore, tributenylalkoxysilane may be disproportionated to dibutenyldialkoxysilane and tetrabutenylsilane. The transformation occurring from the above disproportionations may be shown as follows:

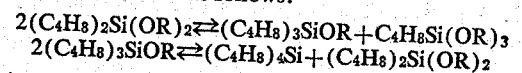

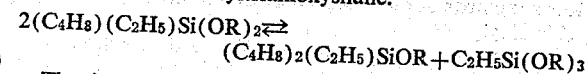

An alkyl radical attached to silicon in addition to the allyl or butenyl radical and the alkoxy radical does not affect the general reaction. For example, butenylethyldialkoxysilane would disproportionate to dibutenylethylalkoxysilane and ethyltrialkoxysilane.

$2(C_4H_8)(C_2H_5)Si(OR)_2 \rightleftarrows$
$(C_4H_8)_2(C_2H_5)SiOR + C_2H_5Si(OR)_3$ The invention permits a redistribution of the groups attached to silicon, in allyl- and butenylalkoxysilanes, whereby silicon-containing molecules having more and less alkoxy groups are obtained.

I claim:

1. A process of disproportionating silanes having the following formula:

wherein

R is a member of the group consisting of allyl and butenyl,
R' is alkyl,
Y is a member of the group consisting of alkyl, alkoxy, allyl and butenyl, and
Z is a member of the group consisting of alkyl, alkoxy, allyl and butenyl;

which comprises treating said silanes at a temperature of at least 150° C. with an alkali metal alkoxide and recovering silanes which contain more and less alkoxy groups bonded to the silicon atom thereof.

2. A process of disproportionating silanes having the following formula:

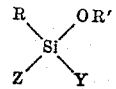

wherein

R is a member of the group consisting of allyl and butenyl,
R' is alkyl,
Y is a member of the group consisting of alkyl, alkoxy, allyl and butenyl, and
Z is a member of the group consisting of alkyl, alkoxy, allyl and butenyl;

which comprises treating said silanes at reflux temperatures with an alkali metal alkoxide and recovering silanes which contain more and less alkoxy groups bonded to the silicon atom thereof.

3. A process of disproportionating butenyltriethoxysilane which comprises treating said butenyltriethoxysilane at a temperature of at least 150° C. with an alkali metal alkoxide and recovering silanes which contain more and less ethoxy groups bonded to the silicon atom thereof.

4. A process of disproportionating butenyltriethoxysilane which comprises treating said butenyltriethoxysilane at reflux temperatures with an alkali metal alkoxide and recovering silanes which contain more and less ethoxy groups bonded to the silicon atom thereof.

5. A process of disproportionating allyltriethoxysilane which comprises treating said allyltriethoxysilane at a temperature of at least 150° C. with an alkali metal alkoxide and recovering silanes which contain more and less ethoxy groups bonded to the silicon atom thereof.

6. A process of disproportionating allyltriethoxysilane which comprises treating said allyltriethoxysilane at reflux temperatures with an alkali metal alkoxide and recovering silanes which contain more and less ethoxy groups bonded to the silicon atom thereof.

7. A process of disproportionating silanes having the following formula:

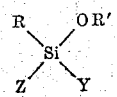

wherein

R is a member of the group consisting of allyl and butenyl,
R' is alkyl,
Y is a member of the group consisting of alkyl, alkoxy, allyl and butenyl, and
Z is a member of the group consisting of alkyl, alkoxy, allyl and butenyl;

which comprises treating said silanes at a temperature of at least 150° C. with sodium ethoxide and recovering silanes which contain more and less alkoxy groups bonded to the silicon atom thereof.

8. A process of disproportionating a dibutenyldialkoxysilane which comprises treating said dibutenyldialkoxysilane at a temperature of at least 150° C. with an alkali metal alkoxide and recovering tributenylmonoalkoxysilane and monobutenyltrialkoxysilane.

9. A process of disproportionating a tributenylalkoxysilane which comprises treating said tributenylalkoxysilane at a temperature of at least 150° C. with an alkali metal alkoxide and recovering tetrabutenylsilane and dibutenyldialkoxysilane.

10. A process of disproportionating a butenylalkyldialkoxysilane which comprises treating said butenylalkyldialkoxysilane at a temperature of at least 150° C. with an alkali metal alkoxide and recovering dibutenylalkylalkoxysilane and ethyltrialkoxysilane.

11. A process of disproportionating a butenyltrialkoxysilane which comprises treating said butenyltrialkoxysilane at a temperature of at least 150° C. with an alkali metal alkoxide and recovering a tetraalkylorthosilicate and a dibutenyldialkoxysilane.

References Cited in the file of this patent

UNITED STATES PATENTS

| | | |
|---|---|---|
| 2,276,094 | Rothrock | Mar. 10, 1942 |
| 2,530,367 | Hance | Nov. 21, 1950 |
| 2,595,727 | Swiss | May 6, 1952 |
| 2,595,730 | Swiss | May 6, 1952 |
| 2,627,451 | Erickson | Feb. 3, 1953 |

OTHER REFERENCES

Calengaert et al.: "Journal Am. Chem. Soc.," vol. 16 (1939), pages 2748–54.

Volnov: "Journal Gen. Chem.," (USSR), vol. 17 (1947), pp. 1428–35.